United States Patent
Shintani

[19]

[11] Patent Number: 5,930,447
[45] Date of Patent: *Jul. 27, 1999

[54] VIDEO TAPE RECORDER FOR INTERMITTENT RECORDING AND HAVING ROTARY HEADS WITH NO STEP THEREBETWEEN

[75] Inventor: Shoichi Shintani, Saitama, Japan

[73] Assignee: Sony Corporation, Tokyo, Japan

[ * ] Notice: This patent is subject to a terminal disclaimer.

[21] Appl. No.: 08/899,658

[22] Filed: Jul. 24, 1997

Related U.S. Application Data

[62] Division of application No. 08/626,269, Apr. 1, 1996, Pat. No. 5,712,944, which is a continuation of application No. 08/331,332, Oct. 28, 1994, abandoned, which is a continuation of application No. 08/238,982, May 6, 1994, abandoned, which is a continuation of application No. 07/986,028, Dec. 4, 1992, abandoned.

[30] Foreign Application Priority Data

Dec. 12, 1991 [JP] Japan ................................. 3-329071

[51] Int. Cl.$^6$ .................................................. H04N 5/783
[52] U.S. Cl. ................................ 386/68; 386/80; 386/81
[58] Field of Search ........................... 386/46, 68, 121, 386/81, 110, 74, 78, 60, 120, 56, 80; H04N 5/783

[56] References Cited

U.S. PATENT DOCUMENTS

| | | | |
|---|---|---|---|
| 4,190,869 | 2/1980 | Ota ............................................. | 386/60 |
| 4,858,032 | 8/1989 | Okada et al. ............................ | 386/121 |
| 4,912,571 | 3/1990 | Sekiya et al. ............................. | 386/78 |
| 4,992,891 | 2/1991 | Komatsu et al. ......................... | 386/56 |
| 5,138,503 | 8/1992 | Nishida ................................... | 386/120 |
| 5,712,944 | 1/1998 | Shitani ...................................... | 386/46 |

*Primary Examiner*—Huy Nguyen
*Attorney, Agent, or Firm*—Frommer Lawrence & Haug, LLP.; William S. Frommer

[57] ABSTRACT

In a video tape recorder capable of recording information for a long time, first and second rotary heads are angularly spaced by 180° and are arranged without a step between their respective planes of rotation. In a frame recording operation, an odd field of a frame is recorded by the first head in a first track on the tape while the latter is in a stationary condition and an even field of the same frame is stored in a field memory, whereupon, the tape is intermittently driven a distance corresponding to the track pitch and then, while the tape is again in its stationary condition, the stored even field is read from the memory and recorded by the second head in a second track adjacent the first track. In a frame still reproducing operation, with the tape in its stationary condition, the odd field recorded in the first track is reproduced by the first head and stored in the memory, and then the tape is advanced one track pitch and with the tape again in its stationary condition the second head repeatedly reproduces the even field recorded in the second track in interleaved relation with the stored odd field repeatedly read from the memory. In an alternative field still reproducing operation, one of the odd and even fields is repeatedly reproduced by the respective one of the rotary heads during scanning of the respective one of the tracks with the tape in it its stationary condition and is stored in the memory, whereupon, that one field stored in the memory is repeatedly read therefrom during scanning of that one track by the other rotary head, and the field repeatedly read from the memory is interleaved with the same field repeatedly reproduced from the tape.

8 Claims, 12 Drawing Sheets recording track pattern operation of continuous reproducing mode head scanning trail of still reproducing mode frame reproduction field reproduction step between magnetic heads patterns of recording tracks operations of continuous reproducing mode head scanning trail in still reproducing mode

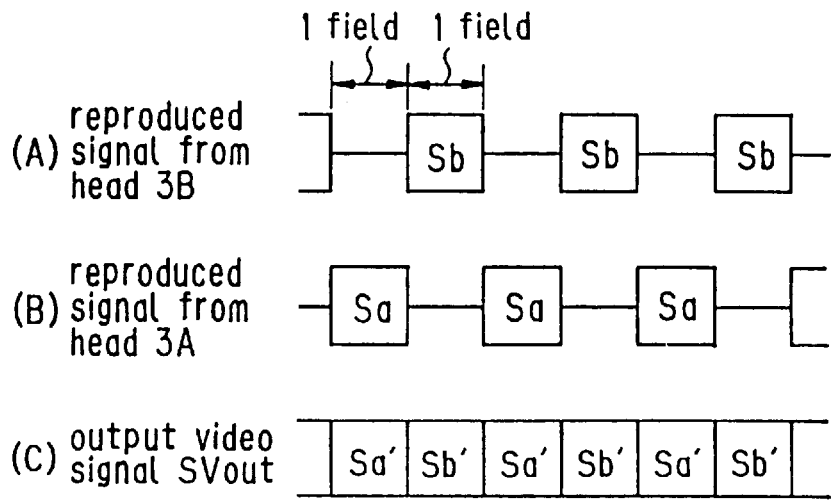
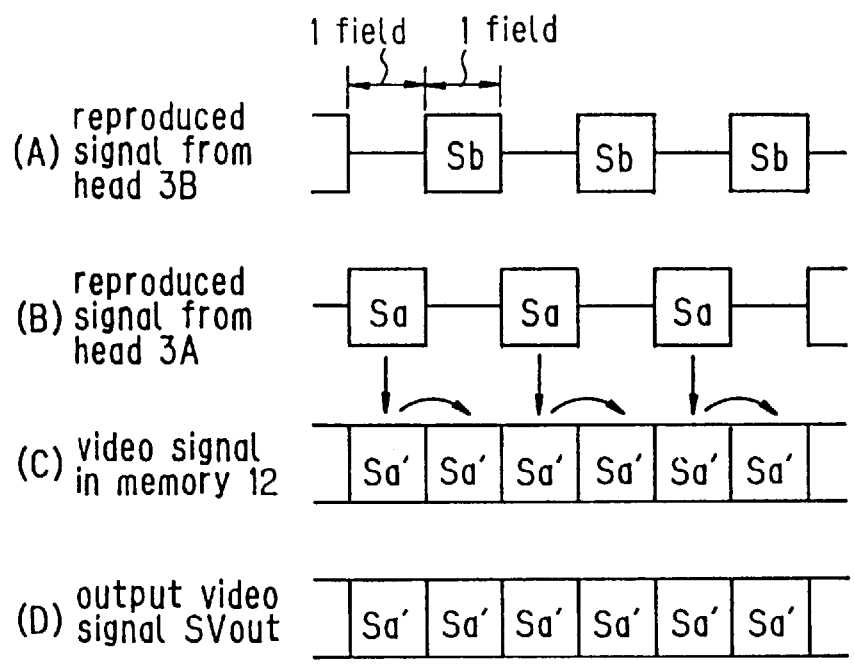

VIDEO TAPE RECORDER FOR INTERMITTENT RECORDING AND HAVING ROTARY HEADS WITH NO STEP THEREBETWEEN

This application is a division of application Ser. No. 08/626,269, filed Apr. 1, 1996, U.S. Pat. No. 5,712,944, which is a Continuation of Ser. No. 08/331,332, filed Oct. 28, 1994, abandoned, which is a Continuation of Ser. No. 08/238,982, filed May 6, 1994, abandoned, which is a Continuation of Ser. No. 07/986,028, filed Dec. 4, 1992, abandoned.

BACKGROUND OF THE INVENTION

1. Field of the Invention

The present invention generally relates to a video tape recorder. More specifically, the present invention is directed to a video tape recorder capable of recording information for a long time and suitable for use as a monitor.

2. Description of the Prior Art

In general, an intermittent recording operation is repeatly performed in a video tape recorder capable of recording information for a long time in order to be useful for a monitoring purpose. In this intermittent recording operation, a recording operation is performed when the video tape is stopped, whereupon, the video tape is fed for a predetermined time interval, and then the recording operation is effected a new a state that this video tape is again stopped. Then, during the reproducing operation, video scenes are reviewed while the tape is continuously fed in the continuous reproducing mode. If there is a video scene to be observed, this video scene may be investigated by sequentially, slowly forwarding or rewinding the tape so that scenes located near the first-mentioned video scene may be observed.

In FIG. 9, there is shown one example of such a long recording time type video tape recorder.

In FIG. 9, reference numeral 1 indicates a rotary head apparatus; reference numeral 2 denotes a tape guide drum; and reference numerals 3A and 3B represent rotary magnetic heads. A magnetic (video) tape 4 is wound on the tape guide drum 2 in an inclined angle over a range of 180°.

The magnetic heads 3A and 3B are mutually arranged with an angular interval of 180° therebetween. These heads 3A and 3B are so arranged that each of the magnetic heads is rotatable through one full revolution within 1 frame period (namely, ⅟30 seconds in the NTSC color TV system). The heads 3A and 3B are mounted in such a manner, as shown in FIG. 10, that there is provided between the heads 3A and 3B, in the direction of the axis of rotation of the heads a step "h" corresponding to 1 track pitch on the magnetic tape 4, and also the azimuth angles of these heads are different from each other.

To an input terminal 5, a video signal SVin of, e.g., the NTSC color TV system, is supplied from a monitoring video camera (not shown) or the like. This video signal SVi is supplied to a recording process circuit 6. In this recording process circuit 6, such processes as the FM modulation of the luminance signal and the low-frequency range conversion for the color (chrominance) signal are carried out.

A recording video signal outputted from the recording process circuit 6 is supplied via a connection switch 7 to the magnetic heads 3A and 3B. The switch operation of this connection switch 7 is controlled by a system controller 8. As will be described later, the magnetic tape 4 is intermittently driven, or transported by a tape drive device, such as, a capstan 15 driven by a motor 16 under control of the system controller 8, during a recording operation, and a video signal for 1 frame is recorded by the heads 3A and 3B on the tape 4 while the tape drive device is in a stop mode. The above-explained connection switch 7 is turned ON in a time period corresponding to the recording period of the video signal by the heads 3A and 3B, so that the recording video signal outputted from the recording process circuit 6 is furnished via the connection switch 7 to the magnetic heads 3A and 3B.

Referring now to FIG. 11, a description will be provided of a recording operation on the magnetic tape 4. It should be noted that, in this recording operation, only 1-frame of a video signal is recorded on the tape 4 during each of 6-frame interval of the recording video signals outputted from the recording process circuit 6.

FIG. 11A represents a video signal SVin to be supplied to the input terminal 5. With respect to symbols of "Aab" and "Bab" shown in FIG. 11A, symbols "A" and "B" indicate an odd field, respectively and an even field of each of the frames and the symbol "ab" represents a b-frame within an a-th tape feeding interval.

FIG. 11B indicates a drive condition of the tape 4. During a first 1-frame period of one tape feeding interval comprised of 6 frames, the tape 4 remains in a stationary condition, and during the subsequent five frame periods, the tape drive is controlled so that the tape 4 sequentially passes from a stop state to a driven state in which the tape 4 is fed over a distance corresponding to the pitch of two tracks in which one frame is recorded, and finally the tape is restored to the stop state.

Since the recording video signal outputted from the recording process circuit 6 is supplied via the connection switch 7 to the heads 3A and 3B during the first frame within the respective tape feeding interval, during which the tape 4 is in the stationary state, the video signals in the odd and even fields of the first frame are recorded on the tape 4. FIG. 11C indicates video signals actually recorded on the tape 4 during successive periods when the tape is in the stationary state.

It should be understood that two recording tracks are formed on the tape 4 for each tape feeding interval of six frames, and the recording video signals for two fields, is, an odd field and an even field, are recorded by the heads 3A and 3B on these recording tracks.

As described above, the long-time recording operation is available since only a single frame of the video signal is recorded on the tape 4 during each respective 6-interval of the recording video signals outputted from the recording process circuit 6, and a so-called "intermittent recording" operation is carried out.

As previously explained, the drive conditions of the tape 4 are controlled by the system controller 8. The tape 4 is driven at the normal reproducing speed in the continuous reproducing mode, whereas the tape 4 is brought into the stationary state or condition in the still reproducing mode under control of the system controller. It should be noted that, when the adjoining video scenes are reproduced in the still reproducing mode, the tape drive condition is sequentially changed from the stop state, to the drive state and again returned to the stop state, which is similar to the tape drive conditions during the above-explained recording operation, so, when in the drive state, the tape 4 is fed by 2 tracks (namely, 1 frame).

As shown in FIG. 9, a reproducing video signal reproduced from the tape 4 by means of a magnetic heads 3A and 3B is supplied to the reproducing process circuit 9. In this reproducing process circuit 9, such processes as the demodulation of the FM luminance signal from the converted low frequency range and the frequency conversion of the color signal are carried out.

A video signal outputted from the reproducing process circuit 9 is supplied to a fixed terminal at a side "a" of a changing switch 10. The video signal outputted from the reproducing process circuit 9 is A/D-converted by an A/D converter 11 into a digital video signal. The resulting digital video signal is supplied as a write signal to a field memory 12. The data writing/reading operations of the field memory 12 are controlled by the system controller 8.

The digital signal read out from the field memory 12 is D/A-converted by a D/A converter 13 into an analog signal which will then be supplied to a fixed terminal at a side "b" of the changing switch 10. The changing operations by the changing switch 10 are performed under control of the system controller 8 in such a manner that, only when the data stored in the field memory 12 is read out, the slider of the changing switch 10 is connected to the side "b" of this switch 10. In all other cases, the slider of the changing switch 10 is connected to the side "a" thereof. A video signal "SVout" derived from the changing switch 10 is conducted to an output terminal 14.

In FIG. 12, there are represented recording track patterns formed on the tape 4. Symbols T0a, T1a, T2a, - - -, denote recording tracks formed by the head 3A, and symbols T0b, T1b, T2b, - - -, represent recording tracks formed by the head 3B.

In the continuous reproducing mode, since the tape 4 is driven at the normal reproducing speed, the scanning trails LA and LB of the magnetic heads 3A and 3B are included from the recording tracks, so that the magnetic heads 3A and 3B cannot correctly scan the recording tracks. Accordingly, in this example, a tracking control operation is carried out in such a way that the central portions of the recording tracks T0a, T1a, T2a,- - -, are scanned by the head 3A. It should also be noted that during the recording operation, a pilot signal has been recorded together with the recording video signal on the respective recording tracks, and then, the well-know ATF type tracking control is performed with reference to the recorded pilot signal.

As previously described the step "h" corresponding to one track pitch, is provided between the magnetic heads 3A and 3B. When tracking control is carried out in such a manner that the central portions of the recording tracks T0a, T1a, T2a, are scanned by the head 3A, the head 3B scans end portions of the recording tracks T0b, T1b, T2b, - - - .

As a result, although the signal level of the reproduced video signal derived from the head 3A is slightly lowered for both ends of each field during which the tape 4 is scanned by this head 3A, a sufficient signal level of this reproduced video signal can be obtained over the entire period of each field. To the contrary, the reproduced video signal derived from the head 3B cannot have a sufficient signal level over the entire period of each field during which the tape 4 is scanned by this head 3B. In FIG. 13A which represents video signals reproduced from the magnetic heads 3A and 3B, symbols Sa1, Sa2, Sa3, - - -, indicate the video signals reproduced from the head 3A, whereas symbols Sb1, Sb2, Sb3, - - -, represent the video signals reproduced from the head 3B.

As explained above, the video signals reproduced from the magnetic head 3B cannot be obtained at sufficient signal levels. If the video signals outputted from the reproducing process circuit 9 would be directly supplied through fixed contact "a" of switch 10 to the output terminal 14, the image quality of the reproduced video screen would be considerably deteriorated due to noise.

Accordingly, in the example of FIG. 9, as shown in FIG. 13B, the video signal outputted from the reproducing process circuit 9 is written into the field memory 12 within each field period during which the tape 4 is scanned by the head 3A, whereas the video signal for the one field which has been written in the previous field period is read out from the field memory 12 within the succeeding field period during which the tape 4 is scanned by the head 3B.

Since the changing switch 10 is normally connected to the side "a" and is connected to the side "b" only when the contents of the field memory 12 are being read therefrom, only the video signal outputted from the reproducing process circuit 9 in response to the reproduced video signal derived from the head 3A, is passed through the switch 10 and then is conducted from the output terminal 14. In FIG. 13C, symbols Sa1', Sa2', Sa3' represent video signals derived from the reproducing process circuit 9 in accordance with the reproduced video signals Sa1, Sa2, Sa3 from the head 3A.

As previously explained, during a playback operation in the continuous reproducing mode, since only the video signal outputted from the reproducing circuit 9, which corresponds to the reproduced video signal a derived from the head 3A, and hence having a sufficient signal level, is supplied to the output terminal 14, deterioration of the image quality of the reproduced video screen is deteriorated due to noise can be prevented.

In the conventional video tape recorder FIG. 9, both of a frame reproduction and a field reproduction can be carried out in a still reproduction mode.

In the still reproduction mode, as illustrated in FIG. 14, since the tape 4 is brought into the stationary condition, the incline of the scanning or traces by the heads 3A and 3B is coincident with that of the recording tracks, so that these heads 3A and 3B can correctly scan the recording tracks. Further, since the tape 4 is brought into the stationary state and the step "h" corresponding to one track pitch is provided between the heads 3A and 3B, when tracking control is performed such that the recording tracks T0a, T1a, T2a, - - -, are scanned by the head 3A, then the head 3B is also positioned so as to scan the relevant recording tracks T0b, T1b, T2b, - - - .

When the frame reproduction is carried out in the still reproduction mode, the changing switch 10 remains connected at the side "a", and the video signals Sa' and Sb' outputted from the reproducing process circuit 9 in response to the video signals Sa, Sb reproduced from the heads 3A and 3B, are directly conducted to the output terminal 14.

FIGS. 15A and 15B, represent the reproduced video signals Sa, Sb output from the heads 3A and 3B and FIG. 15C, shows a video signal "SVout" outputted from the output terminal 14, and in which the video signals Sa' and Sb' for the odd field and the even field are alternately arranged.

When the field reproduction is performed in the still reproduction mode, both the writing operation and the reading operation for the field memory 12 are controlled, by the system controller 8, and also the switching operation of the changing switch 10 is similarly controlled. Thus, the video signals Sa' or Sb' derived from the reproducing process circuit 9 in correspondence to the reproduced video signals Sa or Sb from the heads 3A or 3B, respectively, are conducted via the changing switch 10 to the output terminal 14.

In other words, as shown in FIGS. 16A and 16B, the video signals Sa and Sb are reproduced by the heads 3A and 3B. In the field period during which the reproduced video signal Sa is outputted, the changing switch 10 is connected to the side "a" so that the respective video signal Sa' is supplied directly through switch 10 to the output terminal 14. The video signal Sa' outputted from the reproducing process circuit 9 in accordance with this reproduced video signal Sa is also written into the field memory 12 (FIG. 16c). On the other hand, in the field period during which the reproduced video signal Sb is outputted from the head 3B, the changing switch 10 is connected to the side "b", and then the video signal Sa' which had been written in the field memory 12 during the preceding field is read out from this field memory 12. As a result, a video signal SVout constructed of only the video signal Sa' of the field reproduced by the head 3A is outputted to the output terminal 14, indicated in FIG. 16D.

It should be noted that if the video signal Sb1 outputted from the reproducing process circuit 9 in response to the reproduced video signal Sb outputted from the head 3B is written into the field memory 12 and the switching operation of the changing switch 10 is reversed, a video signal SVout composed of only the video signal Sb' in the field reproduced by the head 3B would be obtained from the output terminal 14.

When there is a large movement in an image, a blurring phenomenon of the image may be mitigated by executing the above-explained field reproduction.

On the other hand, in order to realize the frame recording/reproducing operations while the tape 4 is under in the stationary state with the rotary head apparatus 1 shown in FIG. 9, the step "h" corresponding to one track pitch on the tape 4 has to be formed between the heads 3A and 3B.

However, this step "h" is approximately 17 to 20 microns at the most. Accordingly, since very high machining precision is required to form such a step "h", the manufacturing cost of the rotary head apparatus 1 becomes high.

There is another problem in that when the rotary head apparatus 1 is constructed with the step between the heads 3A and 3B, the normal video signal recording operation cannot be performed. In other words, it is not possible with the apparatus of FIG. 9 to change from the intermittent recording operation to a continuous recording operation as is often required in the security market in an emergency case.

SUMMARY OF THE INVENTION

The present invention has been made in an attempt to solve these problems, and therefore has as an object to provide a video tape recorder capable of performing a frame recording operation while is capable of being a stationary condition and also capable of performing a still reproduction of a frame, while the video tape is intermittently driven.

Another object of the present invention is to provide a video tape recorder capable of performing not only such an intermittent tape drive, but also a normal video recording/reproducing operation, and manufactured at a low cost.

To achieve the above-described objects, in accordance with a first aspect of the invention, a video tape recorder comprises:

a first rotary head and a second rotary head arranged without any step therebetween, but with an angular interval of 180° between the heads; and a field memory; and while a tape is intermittently driven, a video signal of a first field of a predetermined frame is supplied to the first rotary head so as to be recorded on the tape in a first recording, and a video signal of a second field of such predetermined frame is stored in the field memory and supplied therefrom to the second rotary head so as to be recorded on the tape, in a second recording operation, with such first and second recording operations by the firs; and second rotary heads being alternately performed when the tape is in a stationary condition.

A video tape recorder according to a second aspect of the invention comprises:

a first rotary head and a second rotary head arranged without any step therebetween, but with an angular interval of 180° between the heads; and a field memory; and control means by which, when a video signal is reproduced from a tape having a first field signal and a second field signal constituting a predetermined frame recorded on first and second contiguous recording tracks, the video signal of said first field is reproduced from said first recording track by said first rotary head and written into the field memory, the video signal of said second field is reproduced from said second recording track by said second rotary head after the position of the tape has been shifted for alignment with respect to the second rotary head, and the video signal of the first field is read out from the field memory to be interleaved with the video signal of the second field reproduced by the second rotary head.

In accordance with the first aspect of the invention, since the video signals of the first and second fields for constituting a predetermined frame are alternately supplied to the first and second rotary heads so as to be recorded on the tape while the latter is in a stationary state, the tape is intermittently driven, and the video signals of the frame can be recorded without forming any step between the first and second rotary heads. Also, since no step is formed between the first and second rotary heads, the normal video recording operation can be achieved with such heads.

In accordance with the second aspect of the invention, a still reproduction of a frame is possible without providing the step between the first and second rotary heads by reason of the fact that the video signal of the first field reproduced by the first rotary head is written into the field memory, the video signal of the second field is reproduced by the second rotary head after transporting or repositioning of the tape, and then the video signal of the first field read out from the field memory is inserted between or interleaved with the video signals of the second field reproduced by the second rotary head. Once again, since there is no step between the first and second rotary heads, the normal video signal reproducting operation can also be performed.

BRIEF DESCRIPTION OF THE DRAWINGS

The present invention may be best understood by reading the following detailed descriptions of preferred embodiments in conjunction with the accompanying drawings, in which:

FIG. 1A is a digram illustrating the relative positioning of the heads in the VTR of FIG. 1;

FIG. 15 is an explanatory diagram to which reference will be made in explaining a frame reproducing operation of the conventional VTR; and FIG. 16 is an explanatory diagram to which reference will be made in explaining a field reproducing operation of the conventional VTR.

DETAILED DESCRIPTION OF THE PREFERRED EMBODIMENTS

Figure 9:
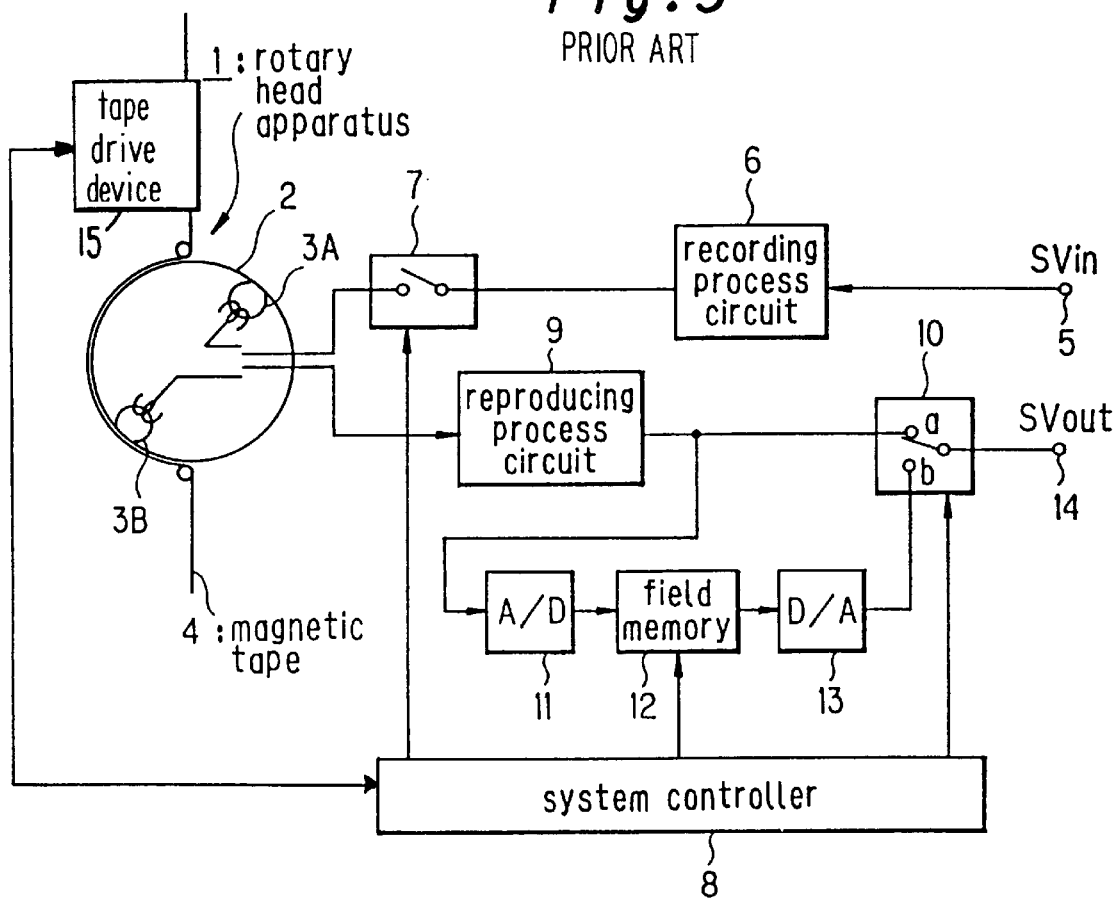
FIG. 9 is a schematic block diagram of a conventional video tape recorder.
Figure 10:
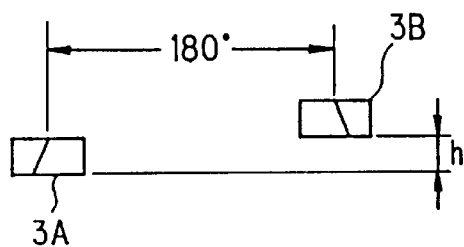
FIG. 10 is a diagram showing a step between heads of the conventional VTR of FIG. 9.

A video tape recorder according to a preferred embodiment of the present invention will now be described with reference to FIG. 1 in which elements identical or similar to those described with reference to FIG. 9 are identified by the same reference numerals and no additional thereof appear in the following descriptions.

The heads 3'A and 3'B of the rotary head apparatus 1 according to this preferred embodiment are mounted for rotary movements in circular points situated in the same reference plane P so that no step is provided between these heads 3'A and 3'B, as particularly shown on FIG. 1A.

Figure 1:
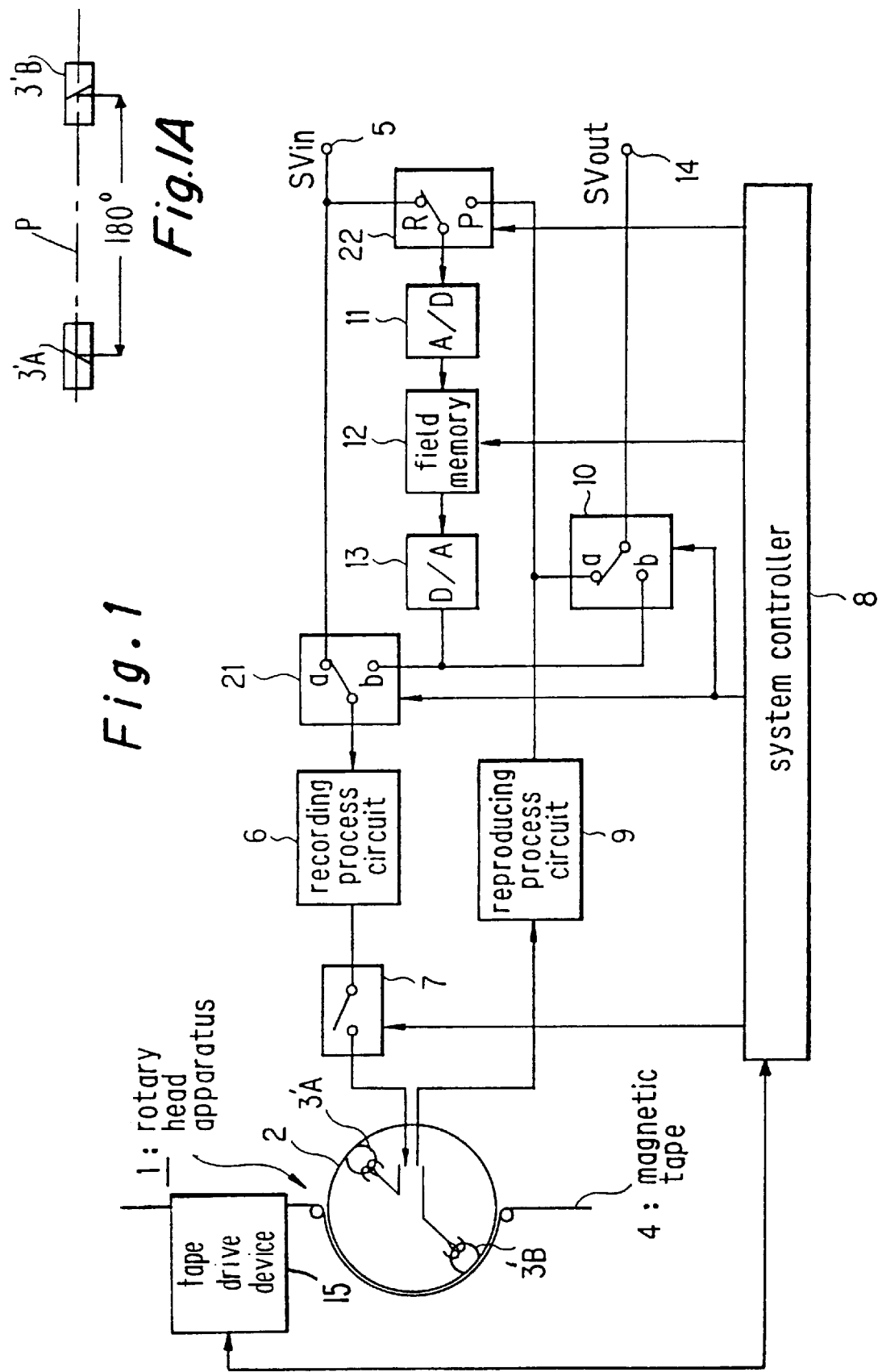
FIG. 1 is a schematic block diagram of a video tape recorder according to a preferred embodiment of the present invention.

In the preferred embodiment of FIG. 1, a video signal SVin supplied to the input terminal 5 is furnished to a fixed terminal of a changing switch 21 at a side "a", and also to a fixed terminal of a changing switch 22 at a side "R". A video signal outputted from the reproducing process circuit 9 is supplied to another fixed terminal of the changing switch 22 at a side "P". The switching operation of this changing switch 22 is controlled by a controller 8 in such a way that the movable or sliding contact of the changing switch 22 is connected to the R side during a recording operation, and to the P side during a reproducing operation.

The video signal outputted from the changing switch 22 is A/D-converted by an A/D converter 11 into a digital video signal which is supplied to a field memory 12 as a write signal. A signal read from the field memory 12 is D/A-converted into an analog video signal by a D/A converter 13. This analog video signal is supplied to a fixed terminal of a changing switch 10 at the side "b", and also to a fixed terminal of the changing switch 21 at the side "b". The switching operations of the changing switch 10 are controlled by the controller 8 in a consistent with the switching operation of the changing switch 22. That is to say, when the switch 22 engages its fixed contact P and the signal is read out from the field memory 12, the changing switch 10 is connected to the side "b", whereas the changing switch 10 is connected to the side "a" in all other cases.

The video tape recorder according to this preferred embodiment having the arrangements specifically above-described otherwise has arrangements similar to those of the VTR of FIG. 9.

In this preferred embodiment, both a field recording operation and a frame recording operation can be performed. Tape feeding intervals during the intermittent recording operation are selected to be 3.5 frames (first interval) and 2.5 frames (second interval) alternately. For the sake of simplicity it will be assumed in, the following description that 6 frames combining the interval with the second interval of 3.5 frames of 2.5 frames correspond to a single tape feeding interval.

Figure 2:
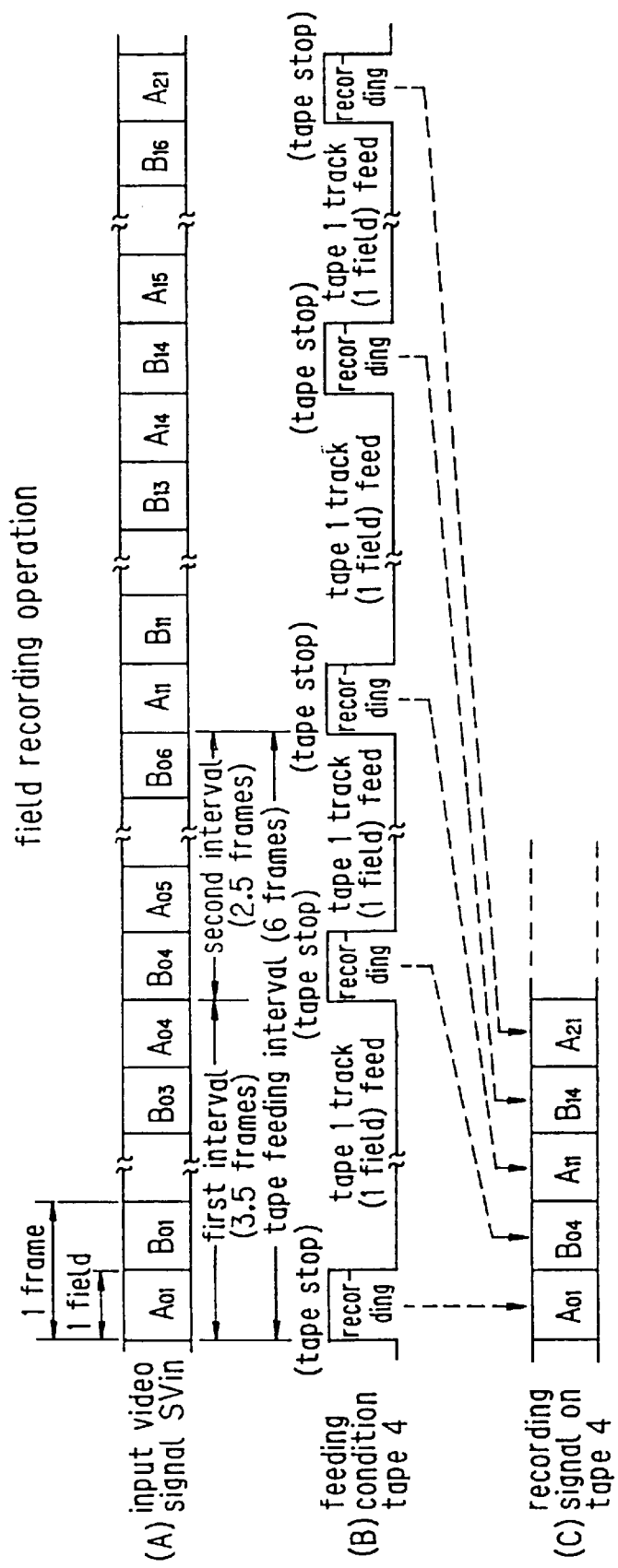
FIG. 2 is an explanatory diagram to which reference will be made in for explaining a field recording operation of the VTR shown in FIG. 1.

First, a field recording operation is explained with reference to FIG. 2.

Figure 11:
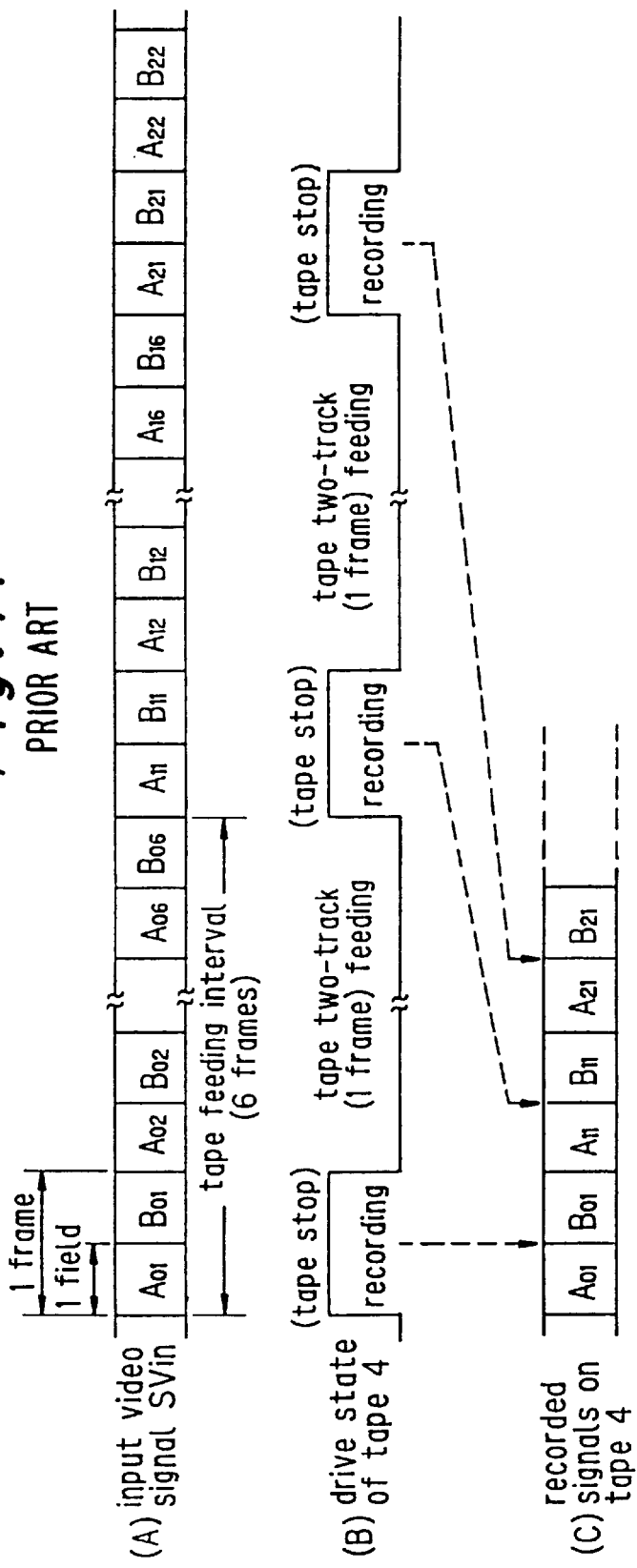
FIG. 11 is an explanatory diagram to which reference will be made in explaining a recording operation of the conventional VTR.

FIG. 2A is similar to FIG. 11A and represents the video signal SVin supplied to the input terminal 5. In this case, a single tape feeding interval is defined by combining the first interval with the second interval with regard to symbols "Aab" and "Bab".

FIG. 2B shows feeding condition of the tape 4 as effected by the capstan 15 driven by the motor 16 under the control of the system controller 8. During the period of the odd field of the first frame in the tape feeding interval (6 frames), for example, during the field $A_{01}$, the tape 4 is under in the stationary condition, and during a period from the even field of the first field frame that is, from the field $B_{01}$ to the field $A_{04}$, to the odd field of the fourth frame, the tape feeding condition is controlled in the manner shown in FIG. 2B, that is, from the stationary state, to the drive state and then returned to the stationary state. When is such drive state, the tape 4 is fed by a distance equivalent to the width of 1 track (1 field). In the subsequent even field of the fourth frame, that is, in the field $B_{04}$, the tape 4 is in the stationary condition. During another period from the odd field of the fifth frame to the even field of the sixth frame, that is, from the field $A_{05}$ to the field $B_{06}$, a tape feed control of stationary state, the drive state, and thereafter the stationary state are established for feeding the tape 4 by 1 track (1 field).

During the periods of the odd field of the first frame $A_{01}$ and also the even field of the fourth frame $B_{04}$ in the respective tape feeding intervals, during which the tape 4 is in the stationary state, the recording video signal outputted from the recording process circuit 6 is supplied via the connecting switch 7 to the heads 3'A and 3'B, respectively. As a result, the video signals in the odd field of the first frame and the even field of the fourth frame are recorded in adjacent tracks on the tape 4, as shown in FIG. 2C.

It should be noted that there are two recording tracks on the tape 4 in which the recording video signals for respective single field have been recorded by the heads 3'A and 3'B in the respective tape feeding intervals.

Even in this field recording operation, only the recording video signal for 1 frame period among the recording video signals for the 6 frames outputted from the recording process circuit 6 during the respective tape feeding interval is recorded on the tape 4 so that, a so-called "intermittent recording operation" is carried out, and thus a long-time recording operation can be performed.

Figure 3:
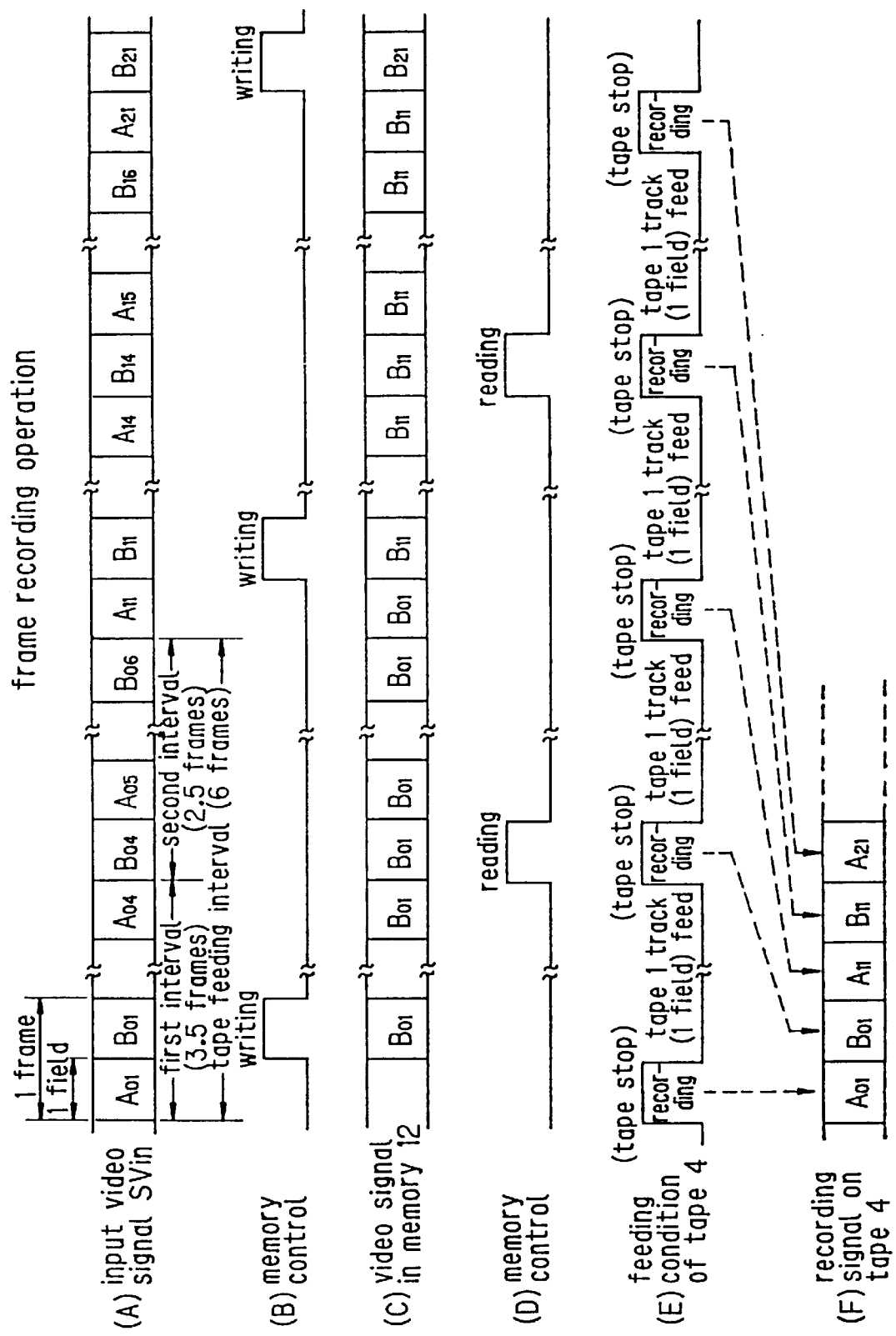
FIG. 3 is an explanatory diagram to which reference will be made in for explaining a frame recording operation of the VTR shown in FIG. 1.

The frame recording operation will now be explained with reference to FIG. 3.

FIG. 3A indicates the video signal SVin supplied to the input terminal 5 and is similar to FIG. 2A. Since the changing switch 22 is connected to the R side during the recording operation, this video signal SVin is converted by the A/D converter 11 into the digital video signal which will then be supplied to the field memory 12.

It should be understood that, as shown in FIG. 3B, the field memory 12 is brought into the write condition during the period of the even field of the first frame for each tape feeding interval, and the video signal of this field is written into the field memory 12. FIG. 3C indicates the video signal written into the field memory 12 during the fields $B_{01}$, $B_{11}$, $B_{21}$ and so forth.

It should also be noted that as indicated in FIG. 3D, the field memory 12 is brought into the reading condition during the period of the even field of the fourth frame of each tape feeding interval, and the video signal of the even field of the first frame, which has been written into the field memory 12, is read out. For example, during the even field of the fourth frame $B_{04}$, the video signal of the even field of the first frame $B_{01}$ is read from the field memory 12.

FIG. 3E illustrates a tape feeding condition similar to that of FIG. 2B. That is, the tape feeding operation is controlled in a manner similar to that for the above-described field recording operation.

The changing switch 21 is normally connected to the side "a", and is changed-over to the side "b" only when the field memory 12 is being read. As a consequence, during the period of the odd field of the first frame in each tape feeding interval during which the tape 4 is is the stationary condition, the video signal of this odd field, for example, the field $A_{01}$, is outputted from the changing switch 21. Also, during the period of the even field of the fourth frame, for example, for example the field $B_{04}$, the video signal for the even field of the first frame, for example, the field $B_{01}$, which is read from the field memory 12, is outputted from this changing switch 21.

Subsequently, during the period defined by the odd field of the first frame and the even field of the fourth frame, respectively, in each tape feeding interval, during which periods the tape 4 is in the stationary state, the recording video signal outputted from the recording process circuit 6 is supplied via the connection switch 7 to the respective heads 3'A and 3'B. As a result, the video signals of the odd field as well as the even field in the first frame are recorded on the tape 4. FIG. 3F represents the video signal actually recorded on the tape 4.

It should be noted that there are two recording tracks formed on the tape 4 by the heads 3'A and 3'B, respectively, during each tape feeding interval of 6 frames duration, and in each of which recording video signals for the 1 field have been recorded by the heads 3'A and 3'B in the respective tracks.

Even in the field recording operation, the recording video signal only for 1 frame period from among the recording video signals for the respective 6 frames outputted from the recording process circuit 6 is recorded on the tape 4, that is, a so-called "intermittent recording operation" is carried out, so that a long-term recording operation can be performed.

In this preferred embodiment, the reproducing operation can be performed in a continuous reproducing mode and a still reproducing mode similar to that of FIG. 9.

First, the reproducing operation in the continuous reproducing mode will now be described. In the continuous reproducing mode, the tape 4 is fed continuously at the normal reproducing speed, and the changing switch 10 is connected to the side "a".

Figure 4:
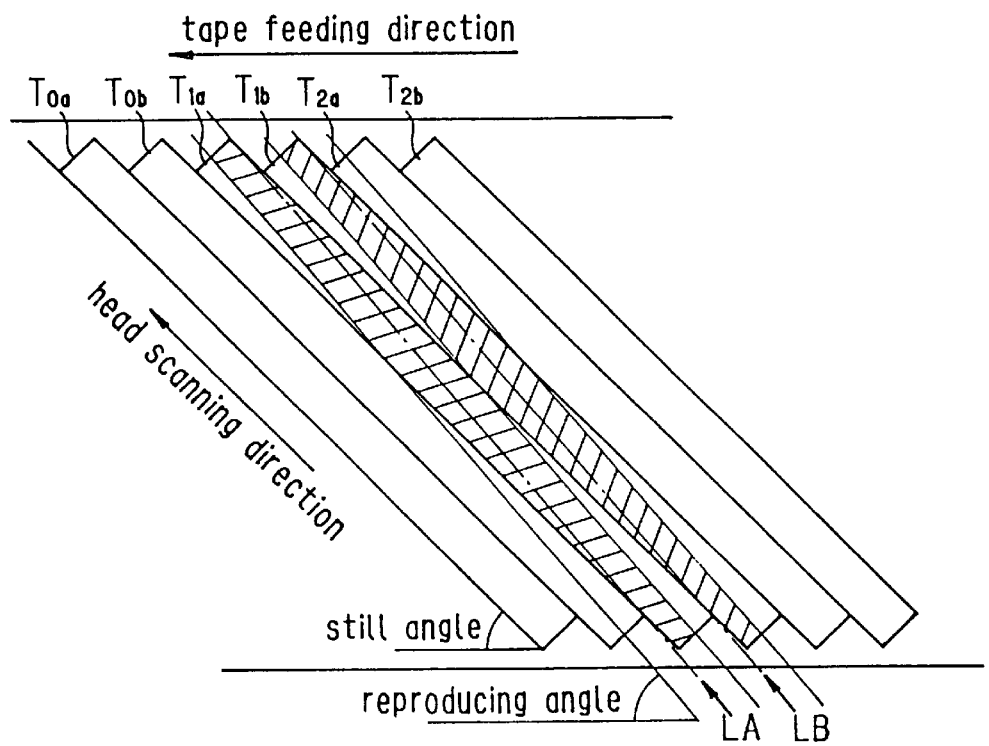
FIG. 4 schematically represents a recording track pattern of the VTR shown in FIG. 1.
Figure 12:
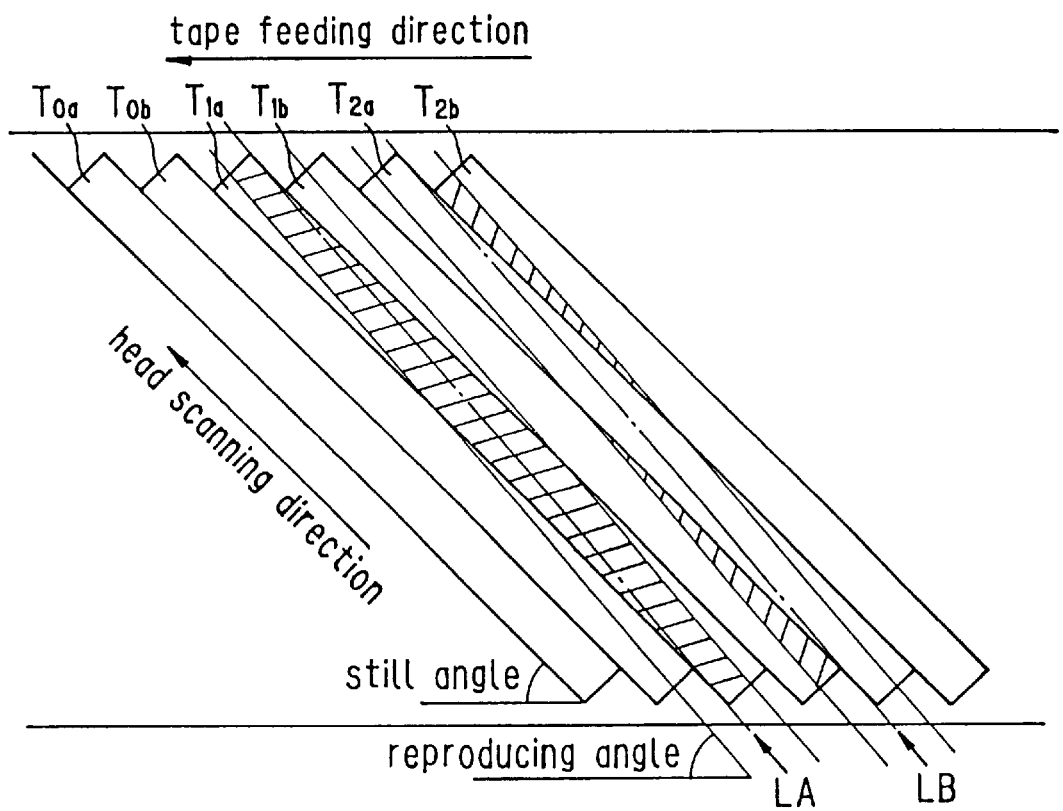
FIG. 12 shows a recording track pattern of the conventional VTR.
Figure 13:
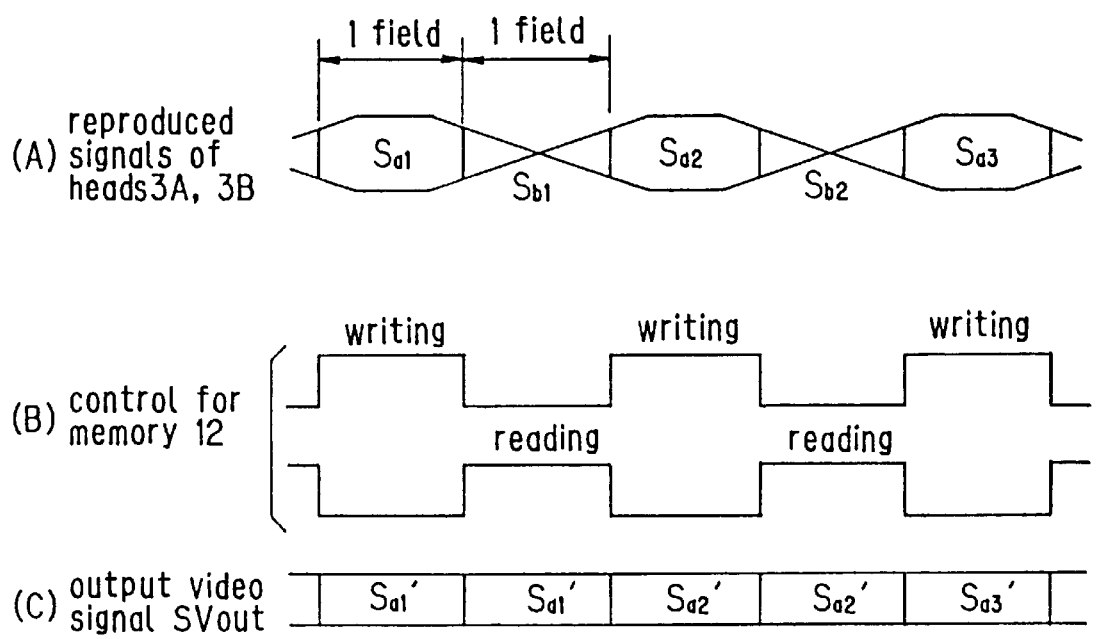
FIG. 13 is an explanatory diagram to which reference will be made in explaining operation of the conventional VTR in a continuous reproducing mode.
Figure 14:
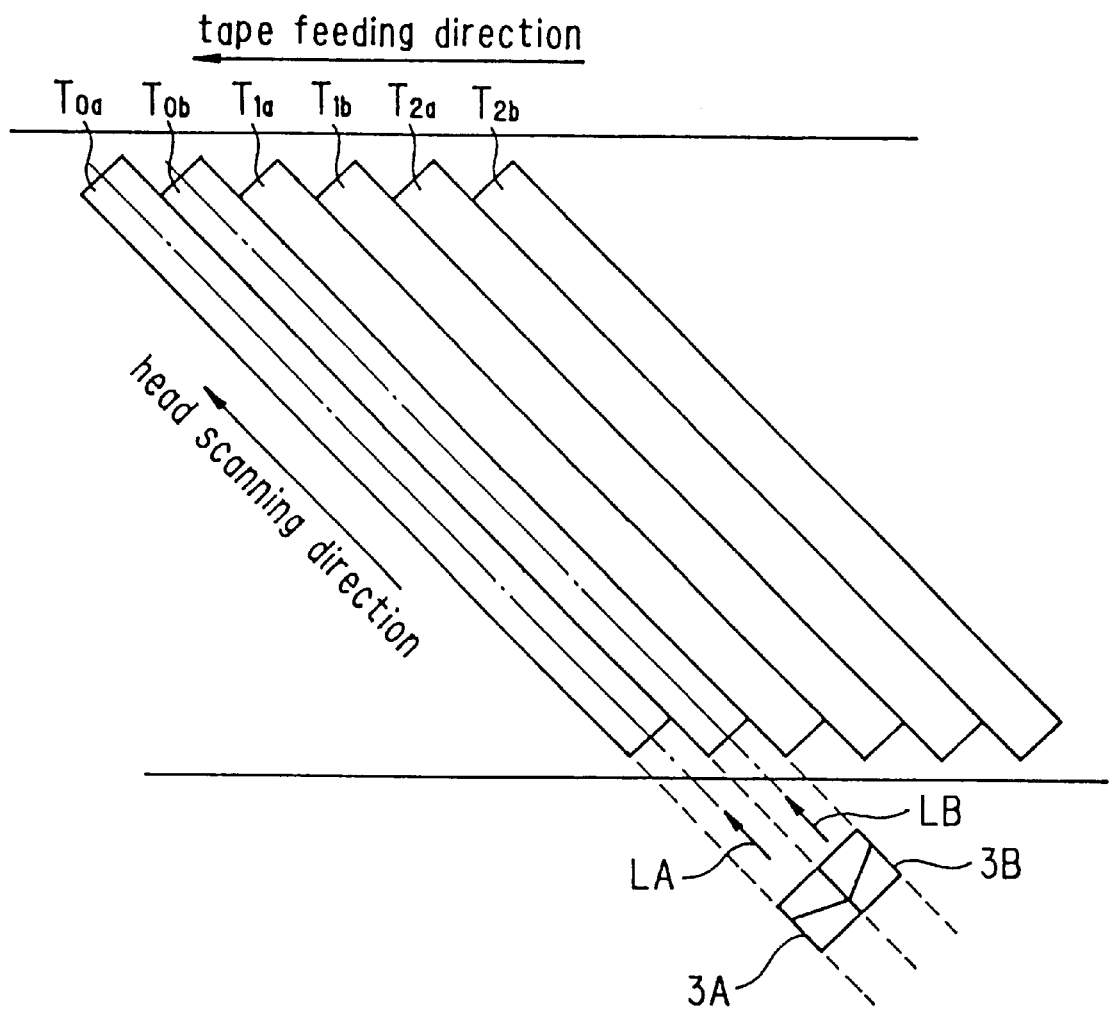
FIG. 14 schematically shows head scanning trails or traces in a still reproducing mode of the conventional VTR.

In FIG. 4, there are represented recording track patterns formed on the tape 4 similar to FIG. 12. Symbols T0a, T1a, T2a, - - -, denote recording tracks formed by the head 3'A, and symbols T0b, T1b, T2b, - - -, represent recording tracks formed by the head 3'B.

In the continuous reproducing mode, since the tape 4 is driven at the normal reproducing speed, the incline of the scanning trails LA and LB of the magnetic heads 3'A and 3'B is different from the incline of the recording tracks formed while the tape is stationary so that the magnetic heads 3'A and 3'B cannot be made to correctly scan the recording tracks. Accordingly, in this embodiment, an ATF type tracking control operation is carried out in such a way that the central portions of the recording tracks T0a, T1a, T2a, - - -, are scanned by the head 3'A, for instance, in a similar manner to that employed by the conventional VTR of FIG. 9.

In accordance with this embodiment of the invention, as distinguished from the conventional VTR of FIG. 9, since there is no step formed between the heads 3'A and 3'B, tracking control is carried out in such a manner that the central portions of the recording tracks T0a, T1a, T2a, - - -, are scanned by the head 3'A and further, another tracking control is performed for the head 3'B in such a way that the central portions of the recording tracks recording tracks T0b, T1b, T2b, - - -, are scanned by this head 3'B.

Figure 5:
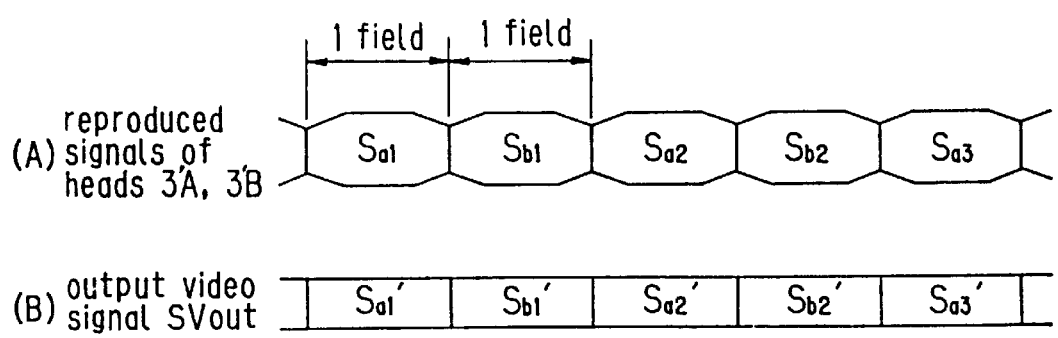
FIG. 5 is an explanatory diagram to which reference will be made in explaining an operation of the VTR shown in FIG. 1 in a continuous reproducing mode.

As a result, although the signal levels of the reproduced video signals Sa1, Sa2, Sa3 and Sb1, Sb2, Sb3 derived from the heads 3'A and 3'B respectively, are slightly lowered for both ends of each field during which the tape 4 is scanned by the heads 3'A and 3'B, a sufficient signal level of this reproduced video signal can be obtained over the entire period of each field, as represented in FIG. 5A.

Since the changing switch 10 is connected to the side "a", the video signals Sa1', Sb1', Sa2', Sb2', Sa3' outputted from the reproducing circuit 9 in accordance with the reproduced video signals alternately derived from the heads 3'A and 3'B are conducted to the output terminal 14 and have sufficient signal levels.

Next, operations in the still reproducing mode will be described. As in the case of the conventional VTR of FIG. 9, both a frame reproducing operation and a field reproducing operation can be carried out in the still reproducing mode of the VTR embodying the present invention.

Figure 6:
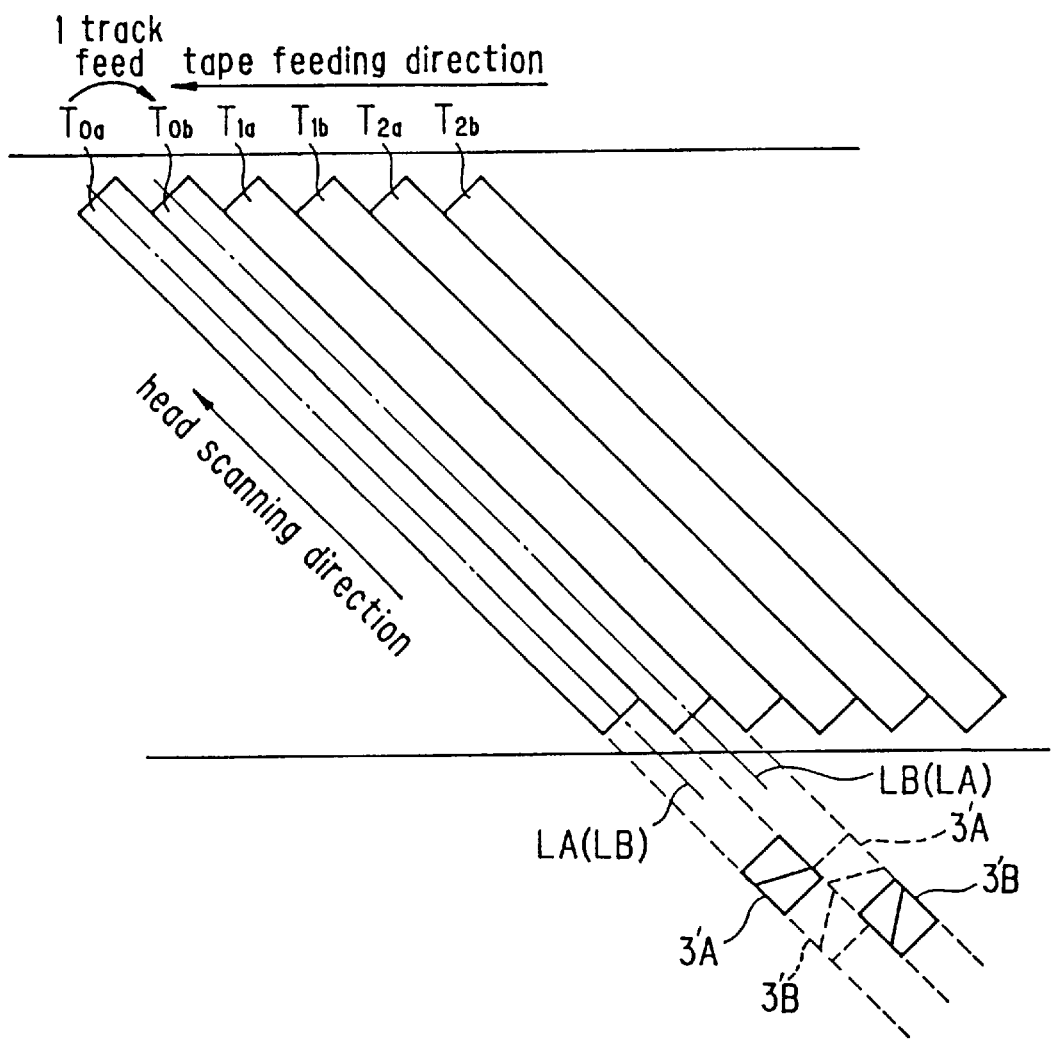
FIG. 6 illustrates head scanning trails or traces in a still reproducing mode of the VTR shown in FIG. 1.

In the still reproduction mode, as illustrated in FIG. 6, since the tape 4 is brought into the stationary condition, the incline of the scanning trails by the heads 3'A and 3'B is coincident with that of the recording tracks, so that these heads 3'A and 3'B can be made to correctly scan the recording tracks. Since the tape 4 is brought into the stationary state and no step is formed between the heads 3'A and 3'B, when tracking control is performed so that a desired one of the recording tracks T0a, T1a, T2a, - - -, is scanned by the head 3'A, the head 3'B is similarly controlled to scan the same recording track. Conversely, when tracking control is performed cause the head 3'B to scan a desired one of the recording tracks T0b, T1b, T2b, - - - , the head 3'A is similarly controlled to scan the same recording track.

Figure 7:
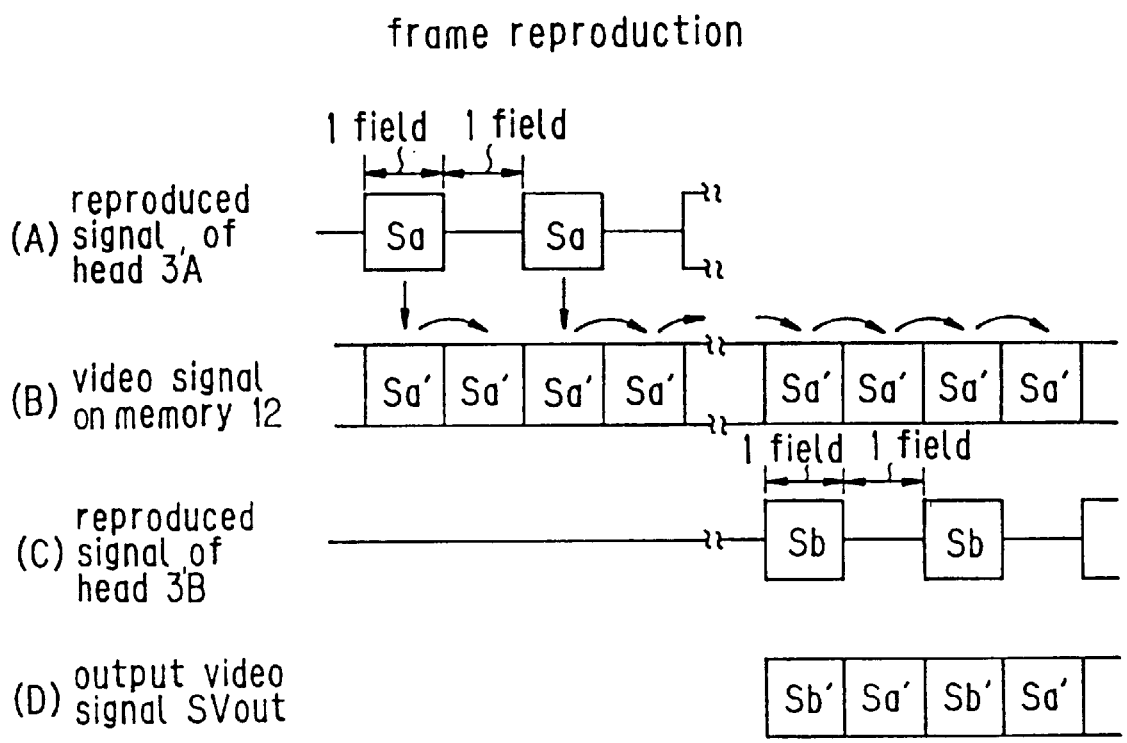
FIG. 7 is an explanatory diagram to which reference will be made in explaining a frame reproducing operation of the VTR of FIG. 1.

When frame reproduction is carried out in the still reproducing mode, tracking control is performed so that a desired one of the recording tracks T0a, T1a, T2a is scanned by the head 3'A. In the field (see FIG. 7A) during which the reproduced video signal Sa is outputted from the head 3'A, the video signal Sa' outputted from the reproducing process circuit 9 in response to this reproduced video signal Sa is written into the field memory 12. In FIG. 7B, there is shown the video signal written into the field memory 12.

Next, tracking control is performed such that the tape 4 is fed by 1 track (1 field) and the relevant one of the recording tracks T1b, T2b, is scanned by the head 3'B. During the field in which the reproduced video signal Sb is outputted from the head 3'B (see FIG. 7C), the changing switch 10 is connected to the side "a", and then the video signal Sb' outputted from the reproducing process circuit 9 in response to the reproduced video signal Sb is outputted from the changing switch 10. On the other hand, during the field in which no reproduced video signal Sb is outputted from the head 3'B, the changing switch 10 is connected to the side "b", and also the video signal Sa' which had been written in the field memory 12 during the preceding field is read out from this field memory 12. Thus, this video signal Sa' is outputted from the changing switch 10.

As a consequence, from the output terminal 14, a video signal SVout is derived in which the video signals Sa' and Sb' for the even field and the odd field constitute one frame and, as shown in FIG. 7D, are alternately arranged.

Figure 8:
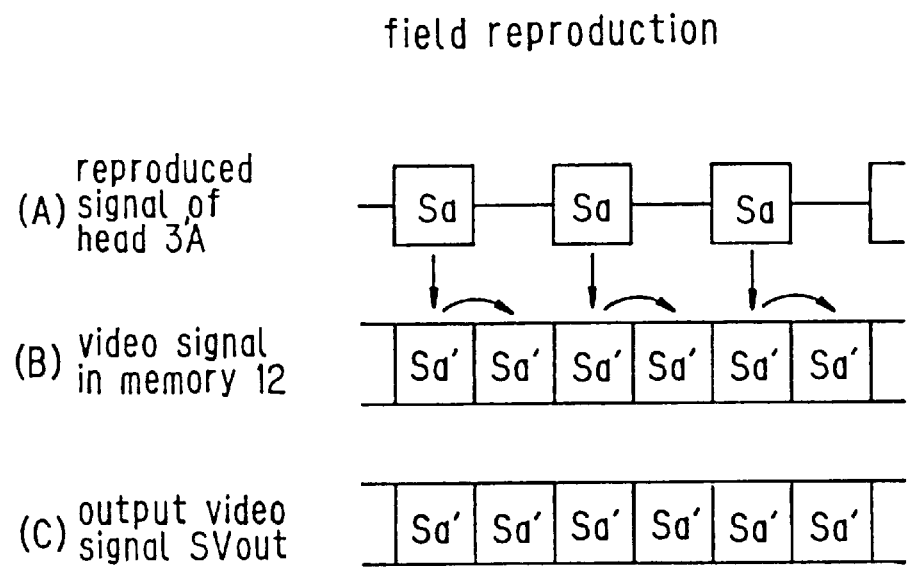
FIG. 8 is an explanatory diagram to which reference will be made in explaining a field reproducing operation of the VTR of FIG. 1.

When the field reproduction is carried out in the still reproducing mode, a tracking control is effected in such a way that a desired one of the recording tracks T0a, T1a, T2a, is scanned by the head 3'A. In the field (see FIG. 8A) in which the reproduced video signal Sa is outputted from the head 3'A, the changing switch 10 is connected to the side so that the video signal Sa' outputted from the reproducing process circuit 9 in response to the reproduced video signal Sa is derived from the changing switch 10, and furthermore this video signal Sa' is written into the field memory 12, as shown in FIG. 8B. On the other hand, in the field in which no reproduced video signal Sa is outputted from the head 3'A, the changing switch 10 is connected to the side "b", so that the video signal Sa' written in the field memory 12 during the previous field is read out from this field memory 12, and then this video signal Sa' is outputted from the changing switch 10.

As a result, a video signal SVout constructed of only the video signal Sa' in the field, which is reproduced by the head 3'A, as shown in FIG. 8C, is derived from the output terminal 14.

It should be noted that, if the video signal Sb' outputted from the reproducing process circuit 9 in accordance with the reproduced video signal Sb derived from the head 3'B is written into the field memory 12 by executing a tracking control such that a desired one of the recording tracks T0b, T1b, T2b - - - , is scanned by the head 3'B, a video signal SVout composed of only the video signal Sb' of the field, which is reproduced by the head 3'B, can be obtained from the output terminal 14.

As previously explained in connection with the above described preferred embodiment, the tape 4 is intermittent fed to carry out the field recording operation. During this recording operation, since there is no step formed between the heads 3'A and 3'B, the tape 4 must be fed. The frame recording operation is performed by delaying the video signal of the even field via the field memory 12 and then recording the delayed video signal of the even field so as to constitute one frame with the earlier recorded video signal of the respective odd field.

The reproducing operation, can be carried out in the continuous reproducing mode and the still reproducing mode. Since no step is formed between the heads 3'A and 3'B in the continuous reproducing mode, the reproduction is performed without using the field memory 12 in a manner similar to that of a normal reproducing operation. During field reproduction in the still reproducing mode, the field reproduction is performed through use of the field memory 12. In frame reproduction in the still reproducing mode, since no step is formed between the heads 3A and 3B, the tape 4 must be intermittently fed, and frame reproduction is performed by reserving in the memory 12 the video signal of the odd field which is reproduced before feeding movement of the tape.

In accordance with this preferred embodiment, since no step is formed between the heads 3'A and 3'B, the rotary head apparatus 1 can be manufactured at low cast. Thus, a video tape recorder capable of performing the intermittent recording operation can be obtained at low cost. Also, since no step is formed between the heads 3'A and 3'B, not only such an intermittent recording operation, but also the normal recording operation can be achieved. Therefore, this video tape recorder may be changed from the intermittent recording operation to the continuous recording operation in an emergency case. Similarly, the normal or continuous reproduction may be performed.

Although the tape feeding interval (by adding the first interval to the second interval) is selected to be 6 frames in the above-described preferred embodiment, the present invention is not limited to this example, but may be applied to other intervals.

As previously described in detail, in accordance with a first aspect of the invention, since the video signals of first and second fields to constitute a predetermined frame are alternately supplied to the first and second rotary heads so as to be recorded on the tape while the latter is in a stationary state, the tape being intermittently driven, the video signals of the frame can be recorded without forming any step between the first and second rotary heads. Also, since no step is made between the first and second rotary heads, a frame recording operation also available. Also, since no step is formed between the first rotary head and the second rotary head, the cost of the rotary head apparatus can be reduced. Furthermore, the video tape recorder designed for the intermittent recording purpose can be manufactured at low cost and can be used to perform normal recording operations.

In accordance with a second aspect of the a still reproduction of a frame is possible without providing a step between the first and second rotary heads, by writing in a field memory the video signal of the first field reproduced by the first rotary head reproducing, the video signal of the second field by the second rotary head after intermittently transporting the tape, and then inserting the video signal of the first field read out from the field memory between the video signals of the second field reproduced by the second rotary head. Here again, since there is no step between first and second rotary heads, the normal video signal reproducing operation can be performed. Moreover, due to the low-cost rotary head apparatus, a video tape recorder capable of frame reproduction in the still mode can be manufactured at relatively low cost.

What is claimed is:

1. A method of recording video signals by a rotary head apparatus including a guide drum on which a recording tape is helically wound over an angular extent of approximately 180°, a first rotary head and a second rotary head having different first and second azimuth angles and being mounted on said drum without any step between respective planes of rotation of said first and second heads, and with an angular interval of 180° between said heads; said method comprising the steps of:

driving said tape intermittently so as to exhibit alternating moving and stationary conditions;

controlling the intermittent driving of said tape;

supplying a first field of a frame of said video signals to said first rotary head for recording with said first azimuth angle in a respective first track of a predetermined pitch on said tape during an interval when said tape is in said stationary condition;

supplying a second field of a frame of said video signals to said second rotary head for recording with said second azimuth angle in a respective second track of said predetermined pitch on said tape during another interval when said tape is again in said stationary condition;

moving said tape a distance corresponding to said predetermined pitch subsequent to each said interval of recording so that said first and second tracks in which said first and second rotary heads alternately record respective fields of said video signals are arranged in succession on said tape; and writing and temporarily storing in a memory said second field of the video signals during movement of the tape subsequent to said interval of recording in said first track and then reading from said memory said second field of the video signals to be supplied to said second rotary head and recording by the latter in said second track only after the tape has been moved and is again disposed in its stationary condition.

2. A method of reproducing from a tape video signals that were recorded while the tape was intermittently driven so that it exhibited moving and stationary conditions, with a first field of a frame of video signals being recorded with a first azimuth angle in a first recording track of a predetermined pitch on the tape during an interval when the tape was in its stationary condition and a second field of a frame of the video signals being recorded with a second azimuth angle different from said first azimuth angle in a second recording track of said pitch on the tape during an interval when the tape was again in its stationary condition, and the tape was intermittently driven to move a distance corresponding to said pitch after each said interval of recording so that said first and second recording tracks are arranged in succession on said tape, said method comprising the steps of:

intermittently driving the recorded tape so as to alternately establish moving and stationary conditions thereof;

reproducing the video signals with first and second rotary reproducing heads having said first and second azimuth angles, respectively, and being mounted on a drum without any step between respective planes of rotation of said first and second reproducing heads, and with an angular interval of 180° between said reproducing heads;

storing a field of the video signals reproduced from said recorded tape;

delivering video signals reproduced from said recorded tape;

selectively supplying video signals reproduced from said recorded tape by said reproducing heads directly to one of: (a) an output or (b) to a memory for storing and thence said output;

writing in said memory during a still frame reproduction mode said first field of the video signals reproduced from said first recording track by said first rotary reproducing head while said recorded tape is in said stationary condition, then moving said recorded tape a distance corresponding to said predetermined pitch and restoring the tape to said stationary condition in which said second field of the video signals is repeatedly reproduced from said second recording track by said second rotary reproducing head, and only then to repeatedly read out said first field of the video signals from said memory and supply the read out first field of the video signals to said output in interleaved relation with said second field of the video signals being then repeatedly reproduced by said second rotary reproducing head from said second recording track, repeatedly reproducing one of said first and second fields of the video signals recorded in a respective one of said first and second recording tracks by a respective one of said rotary reproducing heads repeatedly scanning said one recording track with said tape in said stationary condition during a still field reproduction mode and write said one field of the video signals in said memory, whereupon, said one field of the video signals written in said memory is repeatedly read from the latter during the scanning of said one recording track by the other of said reproducing heads and is supplied to said output in alternating relation to said one field of the video signals being repeatedly reproduced by said one reproducing head.

3. The method of claim 1 in which said frame of the first field that is supplied to said first rotary head is different from said frame of the second field that is supplied to said second rotary head for recording on said tape.

4. The method of claim 3 wherein said first rotary head is supplied successively with video signals of fields that are separated from each other by six frames.

5. The method of claim 1 wherein the video signal of the second field which is supplied to said second rotary head and the video signal of the first field which is supplied to said first rotary head are of the same frame.

6. The method of claim 2 wherein the frame which contains the video signal of said first field differs from the frame which contains the video signal of said second field.

7. The method of claim 2 wherein the video signal of the first field in the first recording track and the video signal of the second field in the second recording track are of the same frame.

8. A method of recording and reproducing video signals by a rotary head assembly including a guide drum on which a recording tape is helically wound over an angular extent of approximately 180°, first and second rotary heads having different first and second azimuth angles, respectively, mounted on said drum without any step between respective planes of rotation of said first and second heads and with an angular interval of 180° between said heads; said method comprising the steps of:

driving said tape intermittently so as to exhibit alternating moving and stationary conditions;

receiving video signals to be recorded on said tape;

selectively supplying the received video signals during a recording mode directly to said heads or indirectly to said heads by way of a memory means; selectively supplying the video signals reproduced from the tape by said heads during a reproducing mode directly to an output or indirectly to said output by way of said memory;

supplying, during said recording mode, a first field of a frame of said video signals from said input to said first head for recording with said first azimuth angle in a respective first track of a predetermined pitch on said tape during an interval when said tape is in said stationary condition and supplying a second field of a frame of said video signals from said input to said second head for recording with said second azimuth angle in a respective second track of said predetermined pitch on said tape during another interval when said tape is again in said stationary condition;

moving said tape a distance corresponding to said predetermined pitch subsequent to each interval of recording so that said first and second tracks in which said first and second heads alternately record respective fields of said video signals are arranged in succession on said tape;

writing and temporarily storing said second field of the video signals in said memory during movement of the tape subsequent to said interval of recording in said first track and then reading said second field of the video signals from said memory for supplying to said second head and recording by the latter in said second track only after the tape has been moved and is again disposed in said stationary condition;

writing in said memory during a still frame reproducing mode said first field of the video signals reproduced from said first recording track by said first head while said tape is in said stationary condition, then moving said tape said distance corresponding to said predetermined pitch and restoring the tape to said stationary condition in which said second field of the video signals is repeatedly reproduced from said second recording track by said second head, and only then repeatedly reading out said first field of the video signals from said memory and supplying the read out first field of the video signals to said output in interleaved relation with said second field of the video signals being then repeatedly reproduced by said second head from said second recording track; and repeatedly reproducing during a still field reproducing mode one of said first and second fields of the video signals recorded in a respective one of said first and second recording tracks by a respective one of said first and second heads which repeatedly scans said one recording track with said tape in said stationary condition and writing said one field of the video signals in said memory, whereupon said one field of the video signals written in said memory is repeatedly read from the latter during the scanning of said one recording track by the other of said heads and is supplied to said output in alternating relation to said one field of the video signals being repeatedly reproduced by said one head.

* * * * *